United States Patent
Yeh et al.

(10) Patent No.: US 11,926,266 B2
(45) Date of Patent: Mar. 12, 2024

(54) INSTALLING MODULE

(71) Applicant: PEGATRON CORPORATION, Taipei (TW)

(72) Inventors: Shih-Wei Yeh, Taipei (TW); Chien-Chih Lin, Taipei (TW); Yi-Ming Chou, Taipei (TW); Chun-Chieh Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/897,096

(22) Filed: Aug. 26, 2022

(65) Prior Publication Data

US 2023/0150438 A1    May 18, 2023

(30) Foreign Application Priority Data

Nov. 18, 2021 (TW) ................................. 110143059

(51) Int. Cl.
*B60R 11/02* (2006.01)
*B60R 11/00* (2006.01)

(52) U.S. Cl.
CPC ... *B60R 11/0229* (2013.01); *B60R 2011/0017* (2013.01); *B60R 2011/0059* (2013.01)

(58) Field of Classification Search
CPC ......... B60R 11/0229; B60R 2011/0017; B60R 2011/0059; B60R 11/02; B60R 2011/0085; B60R 16/0215
USPC .......... 248/200, 309.1, 118, 300, 917, 224.8, 248/224.7, 357; 297/188.06, 217.3, 297/217.4, 188.2
See application file for complete search history.

(56) References Cited

U.S. PATENT DOCUMENTS

| | | | | |
|---|---|---|---|---|
| 7,070,237 B2 * | 7/2006 | Rochel | ............... | B60R 11/0235 297/391 |
| 7,201,443 B2 * | 4/2007 | Cilluffo | ............... | B60N 2/809 297/217.3 |
| 8,136,777 B2 * | 3/2012 | Brawner | ............... | F16M 13/02 248/300 |
| 8,794,700 B2 * | 8/2014 | Brawner | ............ | B60R 11/0229 297/188.05 |
| 9,469,255 B2 * | 10/2016 | Kucera | ................ | B60N 2/879 |

(Continued)

FOREIGN PATENT DOCUMENTS

CN    110239451    9/2019
CN    112550175    3/2021

*Primary Examiner* — Christopher Garft
*Assistant Examiner* — Michael McDuffie
(74) *Attorney, Agent, or Firm* — J.C. PATENTS

(57) ABSTRACT

An installing module includes a seat bracket, a plurality of lower gaskets, a device bracket and an upper gasket. The seat bracket includes a first locking plate and a second locking plate locked to each other. The first locking plate includes a first concave and the second locking plate includes a second concave corresponding to the first concave. The lower gaskets are respectively disposed on the first concave and the second concave. The lower gaskets face each other and jointly define a lower assembly hole and are disposed on a lower side of a head-support fixer of a car seat. The device bracket is locked to the seat bracket and an electronic device is pivotally coupled to the device bracket. The upper gasket is disposed between the device bracket and the head-support fixer, and the head-support fixer is clamped between the upper gasket and the lower gaskets.

10 Claims, 8 Drawing Sheets

(56) References Cited

U.S. PATENT DOCUMENTS

| | | | |
|---|---|---|---|
| 9,701,257 B2* | 7/2017 | Vitito | B60K 37/06 |
| 10,160,362 B2* | 12/2018 | Harris | B60N 2/882 |
| 10,434,953 B2* | 10/2019 | Mitchell | B60R 11/0211 |
| 10,661,723 B2* | 5/2020 | Caltabiano | B60R 11/0235 |
| 10,875,464 B1* | 12/2020 | Tsao | B60R 11/00 |
| 10,906,474 B2* | 2/2021 | Chou | B60R 11/0235 |
| 10,960,828 B2* | 3/2021 | Smith | B60R 11/0235 |
| 11,225,202 B1* | 1/2022 | Line | B60N 2/809 |
| 2006/0032996 A1* | 2/2006 | Wu | B60R 11/0235 |
| | | | 248/218.4 |
| 2011/0155873 A1* | 6/2011 | Montag | B60R 11/02 |
| | | | 248/219.4 |
| 2013/0068809 A1* | 3/2013 | Wang | B60R 11/02 |
| | | | 224/275 |
| 2022/0203878 A1* | 6/2022 | Nakamura | B60N 2/879 |

\* cited by examiner

INSTALLING MODULE

CROSS-REFERENCE TO RELATED APPLICATION

This application claims the priority benefit of Taiwan application serial no. 110143059, filed on Nov. 18, 2021. The entirety of the above-mentioned patent application is hereby incorporated by reference herein and made a part of this specification.

BACKGROUND

Technical Field

The disclosure relates to an installing module.

Description of Related Art

In recent years, electronic products are increasingly used in in-vehicle systems, such as navigation systems, radar detection systems, and rear seat entertainment systems (RSE). In traffic jams or long-distance travel, in addition to drivers who must pay attention to road conditions at all times and cannot be distracted, passengers in the car are often the most bored group due to the limited space in the car. Therefore, in-vehicle multimedia devices have become the best choice for passengers to provide entertainment experience.

At present, the installation of electronic devices such as in-vehicle multimedia devices on car seats is usually installed on the head-support. At present, the installation of electronic apparatuses such as in-vehicle multimedia devices on car seats is usually installed on the head-support. Since there is no dedicated installation device, the steps for installing the electronic apparatus on the head-support are cumbersome and the firmness is poor, which is more likely to affect the normal lifting of the head-support. In addition, this type of in-vehicle electronic apparatus is often only suitable for a specific vehicle with a single installation. Each of the products must have a fixed design for different vehicle models, and cannot be used or shared with other vehicle models. In addition, under the requirements of different vehicle interior options, it is more necessary to have two types of car seat designs (with/without reserved space for the rear seat audio and video system). In addition, the installation of the electronic device will make the head-support appear cluttered, occupy more space inside the vehicle, and have a great impact on the layout and appearance cleanliness of the vehicle interior. Therefore, the application range of the current in-vehicle multimedia device is still very limited and inconvenient.

SUMMARY

The disclosure provides an installing module, which is used for detachably installing an electronic device on a car seat, and has high versatility for vehicles of different models.

In an embodiment of the disclosure, an installing module includes a seat bracket, multiple lower gaskets, a device bracket, and an upper gasket. The seat bracket includes a first locking plate and a second locking plate that are locked to each other. The first locking plate includes a first concave and the second locking plate includes a second concave corresponding to the first concave. The lower gaskets are respectively disposed on the first concave and the second concave. The lower gaskets face each other to jointly define a lower assembly hole and are disposed on a lower side of a head-support fixer of a car seat. The device bracket is locked to the seat bracket and the electronic device is pivotally coupled to the device bracket to rotate relative to the device bracket. The upper gasket is disposed between the device bracket and the head-support fixer and corresponds to the lower gasket, such that the head-support fixer is clamped between the upper gasket and the lower gaskets.

Based on the above, the installing module of the disclosure utilizes the upper gasket disposed on the device bracket and the lower gasket disposed on the seat bracket to jointly clamp the head-support fixer from opposite sides of the head-support fixer, and utilizes locking members to lock the two locking plates of the seat bracket to each other, lock the seat bracket to the car seat, and lock the device bracket to the seat bracket. This configuration may firmly fix the installing module on the car seat. It is not necessary to add other fixing components such as hooks to the car seat of the vehicle to structurally interfere with the snap-fit structure on the back of the car seat, such that the installing module may be applied to the type of vehicle without the snap-fit structure on the back of the car seat. That is to say, the installing module of the disclosure not only improves the stability of the installing module on the car seat, but also improves the versatility of the installing module in various types of vehicles.

DETAILED DESCRIPTION OF DISCLOSED EMBODIMENTS

Figure 1:
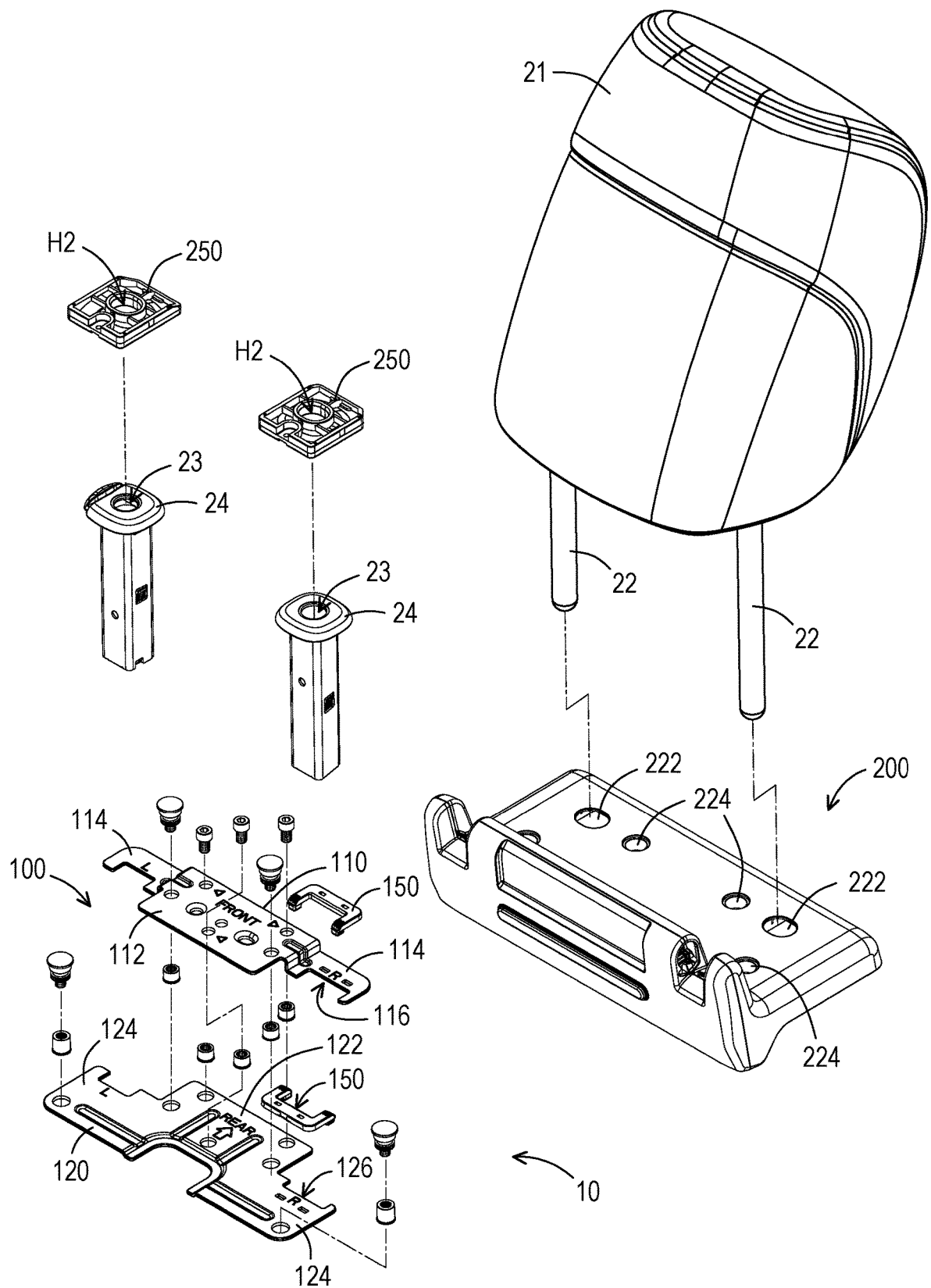
FIG. 1 is an exploded schematic diagram of components of an installing module according to an embodiment of the disclosure.

The above and other technical contents, features and effects of the disclosure will be clear from the below detailed description of each of the embodiments of the disclosure with reference to accompanying drawings. The directional terms mentioned in the embodiments below, like "above", "below", "front", "back", "left", and "right", refer to the directions in the appended drawings. Therefore, the directional wordings are used to illustrate rather than limit the disclosure. Also, in the following embodiments, the same or similar components will be designated by the same or similar reference numerals.

Figure 8:
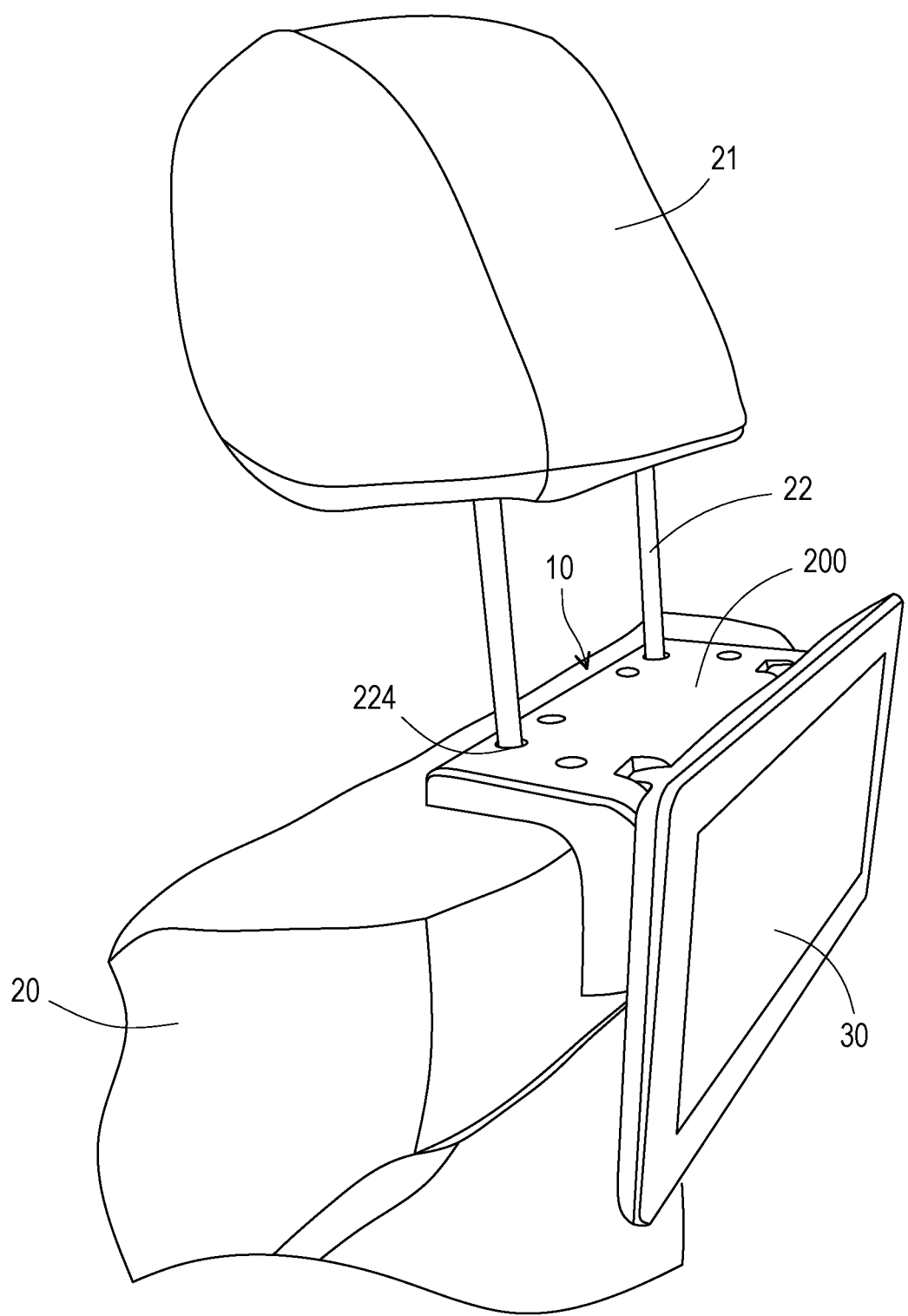

Referring to FIG. 1 and FIG. 8, in one embodiment, an installing module 10 is installed on a car seat 20 of the vehicle, such that an electronic device 30 may be installed on the car seat 20 of the vehicle through the installing module 10. In this embodiment, the electronic device 30 may be an in-vehicle multimedia device. For example, electronic device 30 may include a display. In one embodiment, the electronic device 30 may further include multiple control buttons for controlling the electronic device 30. However, in other implementations, the display is also a touch screen, for the user to use the touch screen to control the electronic device 30, but the disclosure is not limited thereto. The installing module 10 may be installed on the car seat 20 of the vehicle such that the electronic device 30 may be installed, for example, on the back of the car seat 20, such that the passengers in the back seat may operate the electronic device 30 or watch the images and information displayed on the display of the electronic device 30. Of course, this embodiment is only for illustration, and the disclosure does not limit the functions and types of the electronic device.

Figure 2:
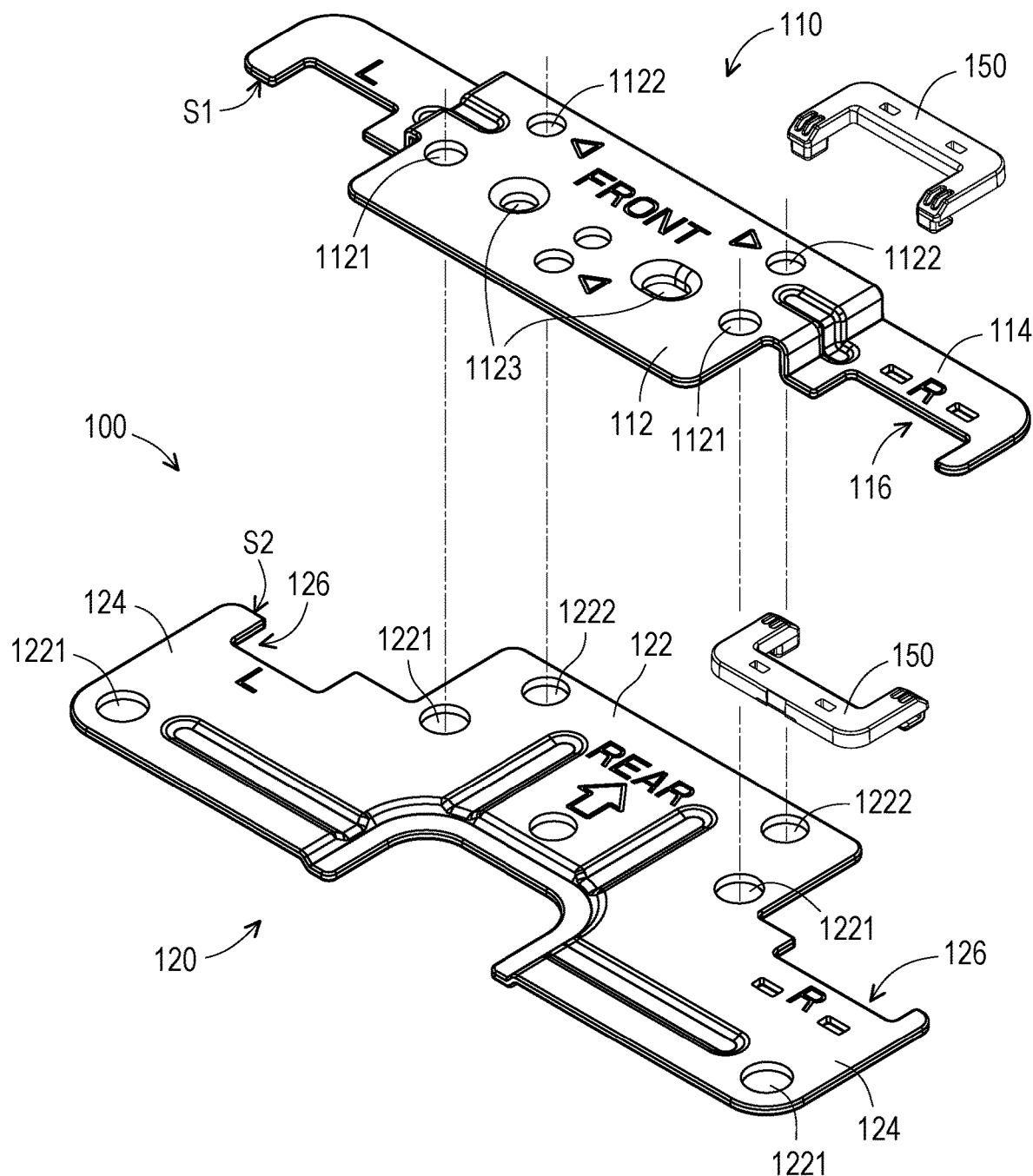
FIG. 2 is an exploded schematic diagram of components of a seat bracket and lower gaskets of an installing module according to an embodiment of the disclosure.

FIG. 1 is an exploded schematic diagram of components of an installing module according to an embodiment of the disclosure. FIG. 2 is an exploded schematic diagram of components of a seat bracket and lower gaskets of an installing module according to an embodiment of the disclosure. Referring to FIG. 1 and FIG. 2, in this embodiment, the installing module 10 may include a seat bracket 100, multiple lower gaskets 150, a device bracket 200, and an upper gasket 250. As shown in FIG. 1, the seat bracket 100 may include a first locking plate 110 and a second locking plate 120 locked to each other. The first locking plate 110 includes a first concave 116, and the second locking plate includes a second concave 126 corresponding to the first concave 116. Specifically, in this embodiment, the first locking plate 110 includes a first locking portion 112 and a first docking portion 114. The first concave 116 is disposed on the first docking portion 114 and located on a first side 51 of the first docking portion 114, and the first locking portion 112 protrudes from the first side 51. Similarly, the second locking plate 120 correspondingly includes a second locking portion 122 and a second docking portion 124. The second concave 126 is disposed on a second side S2 of the second docking portion 124 and the position of the second concave 126 corresponds to the first concave 116. The second locking portion 122 protrudes from the second side S2.

In this configuration, when the first locking plate 110 is assembled with the second locking plate 120 with the first side 51 of the first locking plate 110 facing the second side S2 of the second locking plate 120, the first locking portion 112 may be stacked on the second locking portion 122 as shown in FIG. 2. The first locking portion 112 and the second locking portion 122 may be locked to each other through multiple locking members 134 to fix the relative position between the first locking plate 110 and the second locking plate 120 and lock the first locking plate 110 to the second locking plate 120 to the car seat 20 as shown in FIG. 8. That is to say, when the first locking plate 110 is locked to the second locking plate 120 and viewed from the top view direction, the first locking portion 112 and the second locking portion 122 overlap each other, and the first side 51 of the first docking portion 114 and the second side S2 of the second docking portion 124 face each other.

Figure 3:
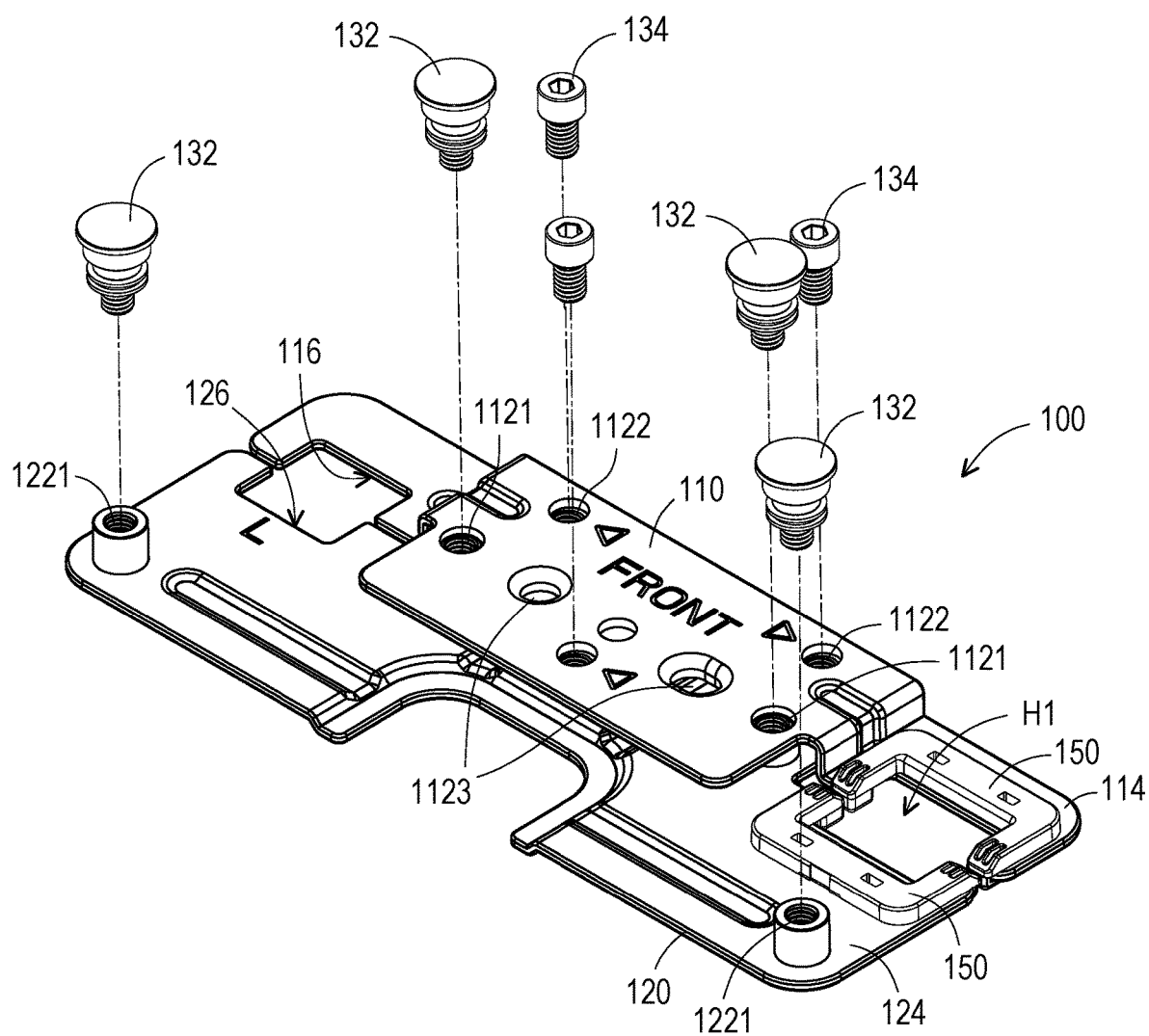
FIG. 3 is an assembly schematic diagram of components of a seat bracket and lower gaskets of an installing module according to an embodiment of the disclosure.

FIG. 3 is an assembly schematic diagram of components of a seat bracket and lower gaskets of an installing module according to an embodiment of the disclosure. Referring to FIG. 2 and FIG. 3 at the same time, in this embodiment, the first locking portion 112 may include at least one first seat locking hole 1122 (four are shown, but not limited thereto), and the second locking portion 122 may include at least one second seat locking hole 1222 (four are shown, but not limited thereto). Moreover, the first seat locking hole 1122 and the second seat locking hole 1222 are aligned with each other when viewed from the top view direction. In this way, at least one locking member 134 (four are shown, but not limited thereto) may respectively pass through the corresponding first seat locking hole 1122 and the second seat locking hole 1222 to lock the first locking plate 110 and the second locking plate 120 to each other. It should be noted that this embodiment is only for illustration, and the disclosure does not limit the number and arrangement positions of the first seat locking holes 1122 and the second seat locking holes 1222, as long as the first seat locking hole 1122 and the second seat locking hole 1222 correspond to each other in number and arrangement positions.

In one embodiment, the car seat of the vehicle may also have locking holes (not shown) corresponding to the first seat locking hole 1122 and the second seat locking hole 1222, such that the locking members 134 may respectively pass through the first seat locking hole 1122 and the second seat locking hole 1222 and be locked in the locking hole of the car seat 20, so that the first locking plate 110 and the second locking plate 120 are locked to each other and locked on the car seat 20 as shown in FIG. 8. The number and arrangement positions of the locking holes of the car seat 20 may correspond to the first seat locking holes 1122 and the second seat locking holes 1222.

In this embodiment, the number of the first concaves 116 is two, and the first locking portion 112 is disposed between the two first concaves 116. Correspondingly, the number of the second concaves 126 is also two, and the second locking portion 122 is disposed between the two second concaves 126. As such, the lower gasket 150 may be respectively disposed on the first concave 116 and the second concave 126, and may be respectively substantially conformal with the first concave 116 and the second concave 126. In this embodiment, the lower gasket 150 also has corresponding concaves, such that when the first locking plate 110 and the second locking plate 120 are locked to each other, the lower gasket 150 disposed on the first concaves 116 and the lower gasket 150 disposed on the second concave 126 may face each other to jointly define lower assembly holes H1 shown in FIG. 3, which are respectively used for passing through the two head-support rods 22 of the head-support structure 21 shown in FIG. 1. In this embodiment, the lower gaskets 150 are simply shown as two, which are respectively disposed on the first concave 116 on the right side and the second concave 126 on the right side. However, in other embodiments, the number of the lower gaskets 150 may be four, which are respectively disposed on each of the first concaves 116 and each of the second concaves 126 to jointly define two lower assembly holes H1. It should be noted that this embodiment is only for illustration, and the disclosure does not limit the number and arrangement positions of the first concaves 116, the second concaves 126, and the lower gaskets 150, as long as the first concaves 116, the second concaves 126, and the lower gaskets 150 correspond to one another in number and arrangement position, and corresponding to the number of head-support rods.

In this embodiment, the lower gasket 150 may be respectively fixed on the first concave 116 and the second concave 126 by snapping or buckling. For example, the lower gasket 150 and the first concaves 116 and the second concaves 126 may respectively have a snapping or a buckling structure that is structurally matched with one another, so as to fix the lower gasket 150 on the first concaves 116 and the second concaves 126. Of course, this embodiment is not limited thereto, and in other embodiments, the lower gasket 150 may also be fixed on the first concaves 116 and the second concaves 126 by adhering, locking, or other suitable methods. Even, in one embodiment, the lower gasket 150 may be integrally formed directly at the first concaves 116 and the second concaves 126 of the first locking plate 110 and the second locking plate 120. The disclosure is not limited thereto.

Figure 4:
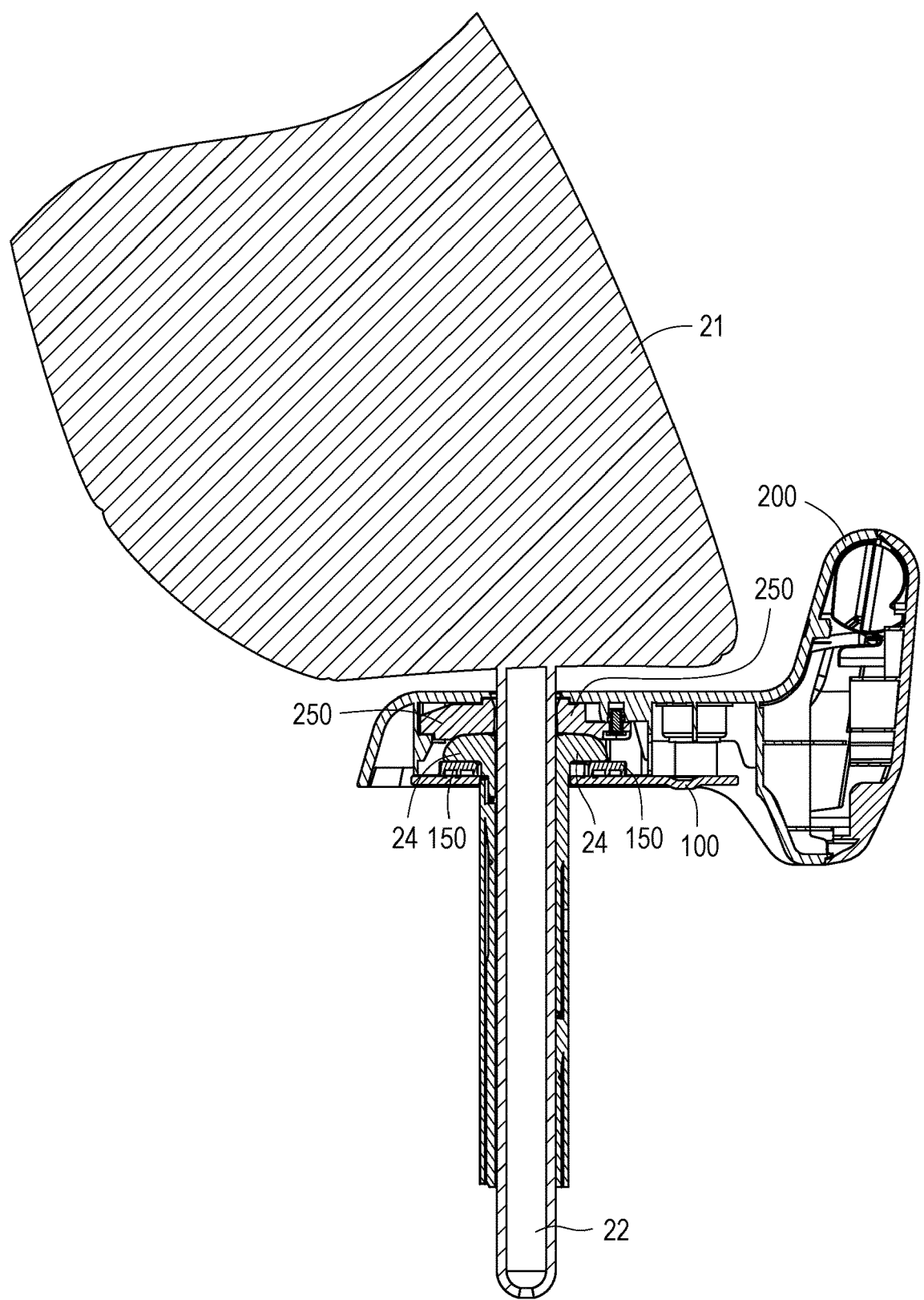
FIG. 4 is a cross-sectional schematic diagram of an installing module installed on a head-support fixer according to an embodiment of the disclosure.
Figure 5:
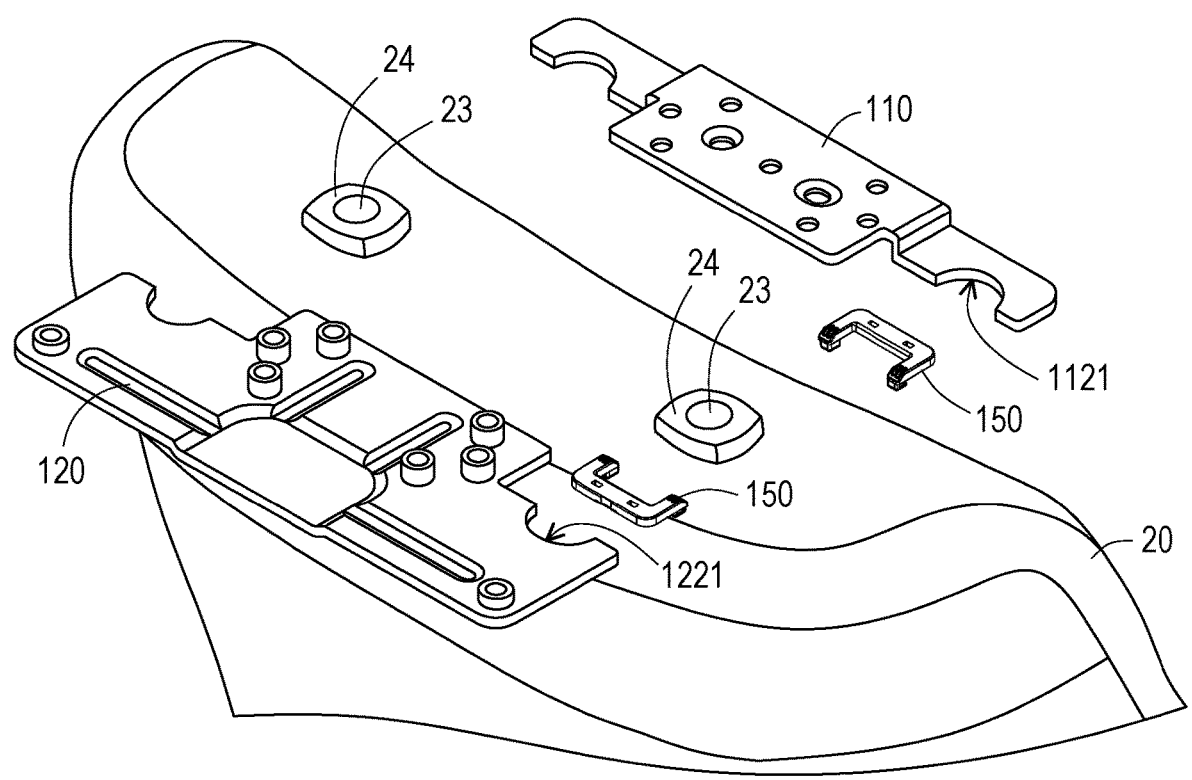
FIG. 5 to FIG. 8 are schematic diagrams illustrating a component assembly process of an electronic device assembly according to an embodiment of the disclosure.

FIG. 4 is a cross-sectional schematic diagram of an installing module installed on a head-support fixer according to an embodiment of the disclosure. FIG. 5 to FIG. 8 are schematic diagrams illustrating a component assembly process of an electronic device assembly according to an embodiment of the disclosure. Referring to FIG. 4 and FIG. 5, the car seat 20 of the vehicle may include head-support fixers 24 as shown in FIG. 5. In this embodiment, the number of the head-support fixers 24 may be two corresponding to the number of the head-support rods. Each of the head-support fixers 24 may have a clearance hole 23 penetrating the head-support fixer 24, in this way, the head-support rods 22 of the head-support structure 21 may be respectively inserted into the corresponding clearance holes 23, and the head-support rod 22 may be fixed on the car seat through the head-support fixer 24. In this embodiment, the lower gasket 150 is disposed on the lower side of the head-support fixer 24 of the car seat 20 and sandwiched between the head-support fixer 24 and the upper surface of the car seat 20. In this configuration, the first locking portion 112 of the first locking plate 110 and the second locking portion 122 of the second locking plate 120 may be locked to each other between the two head-support fixers 24, and the first docking portion 114 and the second docking portion 124 may be fixed between the head-support fixer 24 and the upper surface of the car seat 20.

Figure 6:
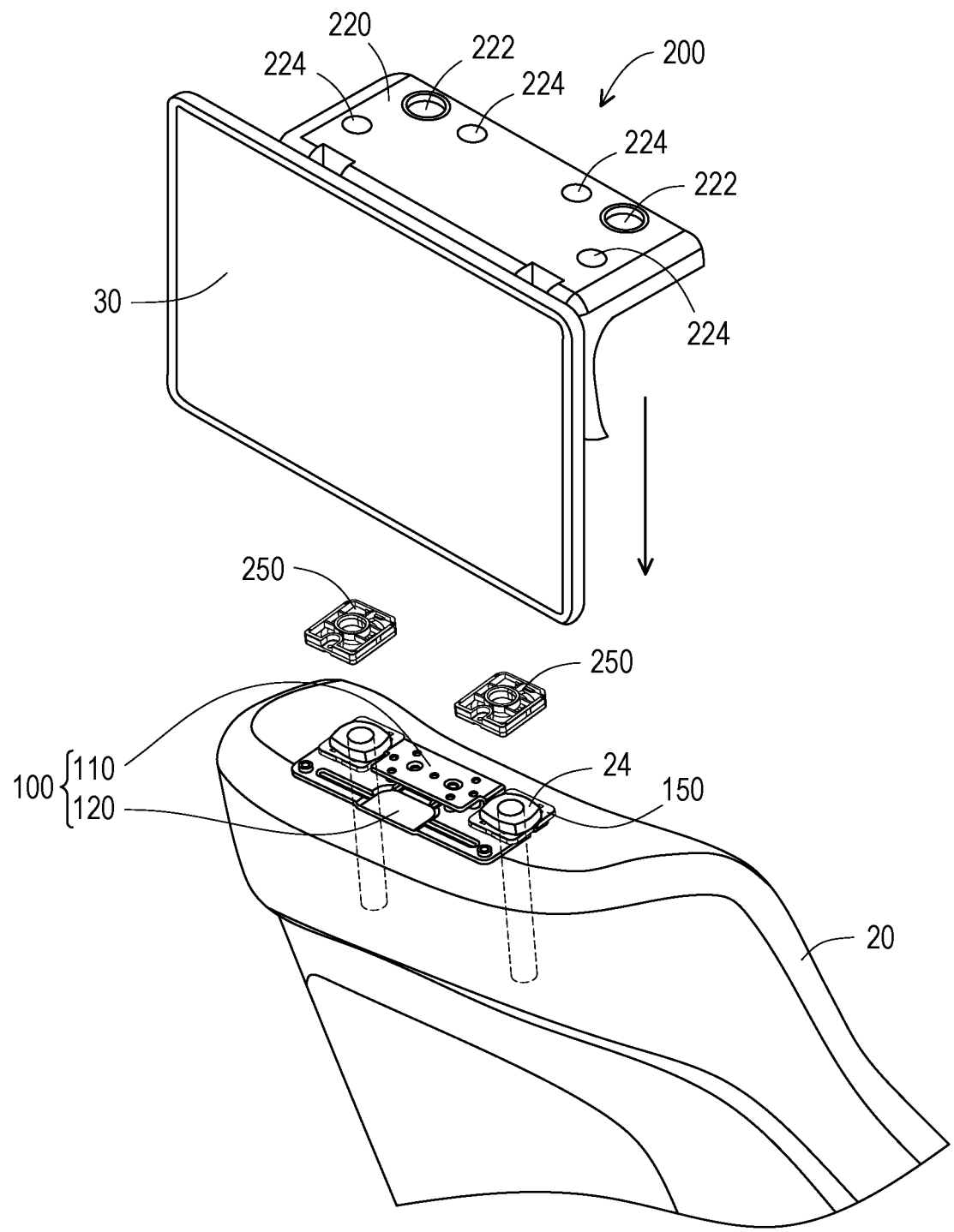

Referring to FIG. 6, after the seat bracket 100 is locked on the car seat 20, the device bracket 200 may be locked on the seat bracket 100 as shown in FIG. 6, and the electronic device 30 may be pivotally coupled to the device bracket 200 to rotate relative to the device bracket 200.

In this embodiment, the electronic device 30 may be an in-vehicle multimedia device, which may include a display. In this configuration, the electronic device 30 may be locked on the seat bracket 100 through the device bracket 200. In this embodiment, the device bracket 200 may correspondingly include multiple clearance holes 222 for passing the head-support rod 22 as shown in FIG. 8, thereby fixing the device bracket 200 on the car seat 20.

In this embodiment, the upper gasket 250 is disposed between the device bracket 200 and the head-support fixer 24, that is, located on the upper side of the head-support fixer 24 and corresponding to the lower gasket 150. In other words, the upper gasket 250 and the lower gasket 150 may be respectively disposed on opposite sides of the head-support fixer 24 to clamp the head-support fixer 24 between the upper gasket 250 and the lower gasket 150. In this configuration, the upper gasket 250 disposed on the device bracket 200 and the lower gasket 150 disposed on the seat bracket 100 jointly clamp the head-support fixer 24 from opposite directions, such that the installing module 10 may be firmly fixed on the car seat of the vehicle without adding other fixing components such as hooks to structurally interfere with the snap-fit structure on back of the seat, such that it may be applied to the type of vehicle that does not have a snap-fit structure on the back of the car seat. That is, the installing module 10 of the disclosure not only improves the stability of the installing module 10 on the car seat, but also improves the versatility of the installing module 10 in various types of vehicles.

In one embodiment, the upper gasket 250 may be disposed (fixed) on the lower surface of the device bracket 200 at a position corresponding to the lower gasket 150 through, for example, snapping, and then locked on the seat bracket 100 together with the device bracket 200. In this embodiment, the upper gasket 250 includes an upper assembly hole H2 penetrating the upper gasket 250, which corresponds to (aligns with) the lower assembly hole H1 defined by the lower gaskets 150. In this way, the head-support rod 22 shown in FIG. 8 may respectively pass through the upper assembly hole H2 and the lower assembly hole H1 and be fixed on the head-support fixer 24. For example, the material of the upper gasket 250 and the lower gasket 150 may include polypropylene (PP), polyvinyl chloride (PVC), polyurethane (PU), unsaturated polyester, ABS resin, phenolic resin (PF), polyethylene (PE), or polyimide (PA) or other suitable vehicular plastic materials, etc.

Figure 7:
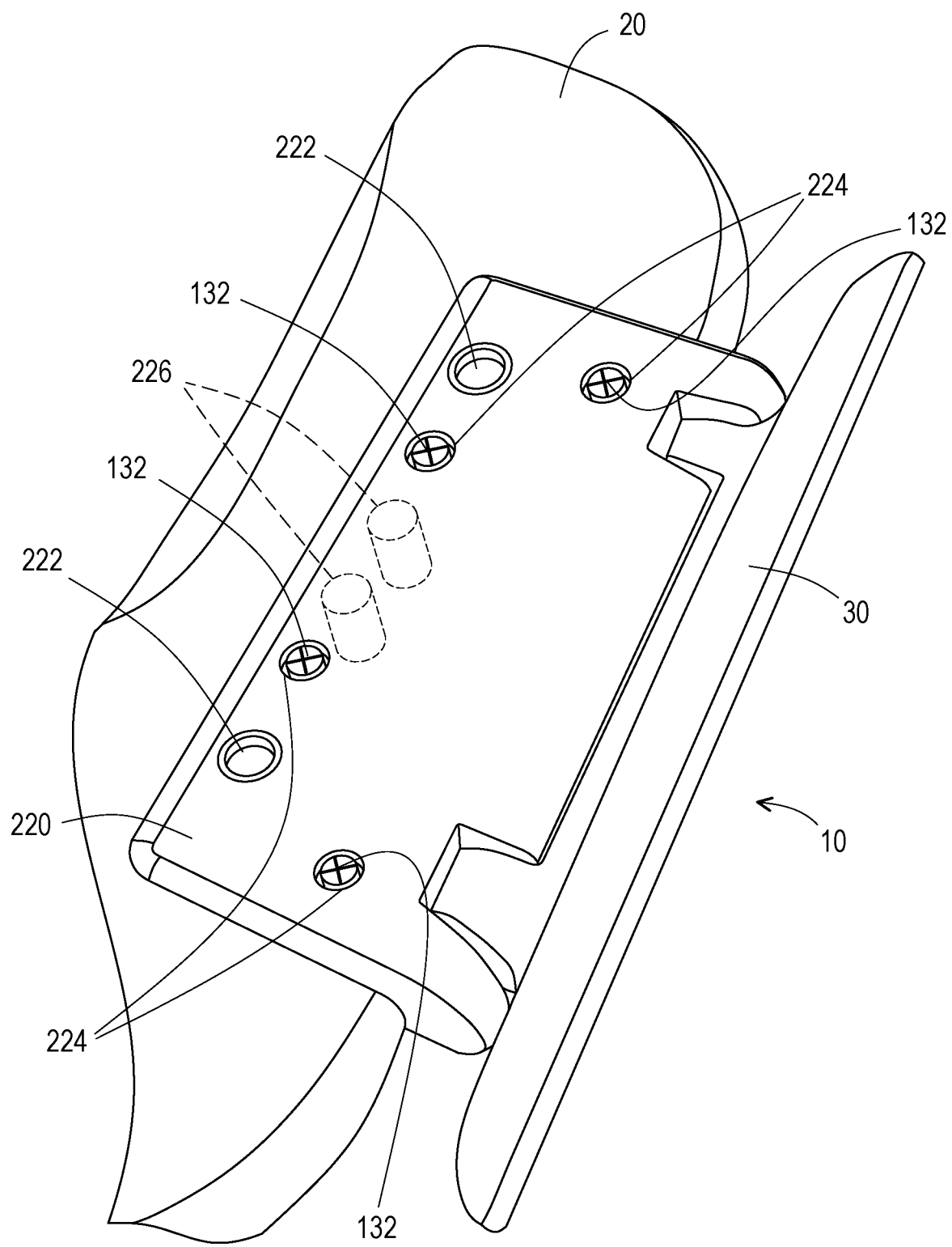

Referring to FIG. 6 and FIG. 7, in one embodiment, the first locking portion 112 may include at least one first device locking hole 1121 (two are shown), and the second locking portion 122 may include at least one second device locking hole 1221 (four are shown), in this way, the device bracket 200 may further include at least one locking hole 224 (four are shown). In such a configuration, at least one locking member 132 (four are shown) may respectively pass through the locking hole 224 of the device bracket 200 and the first device locking hole 1121 and the second device locking hole 1221 of the seat bracket 100 to lock the device bracket 200 to the first locking portion 112 and the second locking portion 122 of the seat bracket 100. The disclosure does not limit the number of locking holes and corresponding locking members.

In this embodiment, two of the second device locking holes 1221 may correspond to the two first device locking holes 1121 on the first locking portion 112, in this way, two of the locking members 132 may respectively pass through the two locking holes 224 of the device bracket 200 and the first device locking hole 1121, and the second device locking hole 1221 corresponding to each other. The other two locking members 132 may respectively pass through the other two locking holes 224 of the device bracket 200 and the other two second device locking holes 1221 of the second locking portion 122, to further fix the device bracket 200 on the seat bracket 100. That is, the number of the first device locking holes 1121 and the number of the second device locking holes 1221 may be different. Of course, in other embodiments, the number of the first device locking holes 1121 and the number of the second device locking holes 1221 may be the same and corresponding to each other. In this embodiment, the locking members 132 and 134 may be, for example, screws, and the locking holes 1121, 1122, 1221, and 1222 may be corresponding screw holes.

Besides, in this embodiment, the first locking portion 112 may further include at least one positioning hole 1123 (two are shown) as shown in FIG. 2, and the device bracket 200 may further include at least one positioning column 226 as shown in FIG. 7, which may protrude from the lower surface of the device bracket 200 facing the first locking portion 112, to pass through the positioning hole 1123 of the first locking portion 112, thereby the device bracket 200 may be further positioned on the first locking plate 110. So far, the installing module 10 including the seat bracket 100, the lower gasket 150, the device bracket 200, and the upper gasket 250 is basically assembled. With this configuration, the installing module 10 of this embodiment may be applied to various types of vehicle. The assembly method is simple, and has a compact thickness and appearance, which greatly increases the application range of the installing module 10.

Referring to FIG. 8, after the device bracket 200 is locked on the seat bracket 100, the head-support rod 22 of the head-support structure 21 may be inserted into the clearance hole 23 of the head-support fixer 24. In this way, the device bracket 200 and the seat bracket 100 may be jointly clamped to the head-support fixer 24 through the upper gasket 250 and the lower gasket 150. In such a structural configuration, the seat bracket 100 is hidden under the device bracket 200 and is not exposed, such that the car seat 20 of the vehicle has a cleaner appearance.

To sum up, the installing module of the disclosure utilizes the upper gasket disposed on the device bracket and the lower gasket disposed on the seat bracket to jointly clamp the head-support fixer from opposite sides of the head-support fixer, and utilizes locking members to lock the two locking plates of the seat bracket to each other, lock the seat bracket to the car seat, and lock the device bracket to the seat bracket. This configuration may firmly fix the installing module on the car seat. It is not necessary to add other fixing components such as hooks to the car seat of the vehicle to structurally interfere with the snap-fit structure on the back of the car seat, such that the installing module may be applied to the type of vehicle without the snap-fit structure on the car seat. Therefore, the installing module of the disclosure not only improves the stability of the installing module on the car seat, but also improves the versatility of the installing module in various types of vehicles. In addition, the seat bracket is hidden under the device bracket and is not exposed, such that the car seat of the vehicle has a cleaner appearance.

What is claimed is:

1. An installing module, installed on a car seat of a vehicle to install an electronic device, the installing module comprising:
    a seat bracket, comprising a first locking plate and a second locking plate that are locked to each other, wherein the first locking plate comprises a first concave and the second locking plate comprises a second concave corresponding to the first concave;
    a plurality of lower gaskets, respectively disposed on the first concave and the second concave, wherein the lower gaskets face each other to jointly define a lower assembly hole and are disposed on a lower side of a head-support fixer of the car seat;
    a device bracket, locked to the seat bracket, wherein the electronic device is pivotally coupled to the device bracket to rotate relative to the device bracket; and
    an upper gasket, disposed between the device bracket and the head-support fixer and corresponding to the lower gasket, such that the head-support fixer is clamped between the upper gasket and the lower gaskets,
    the lower gaskets are sandwiched between the head-support fixer and a upper surface of the car seat, the upper gasket is located on a upper side of the head-support fixer.

2. The installing module according to claim 1, wherein the upper gasket comprises an upper assembly hole penetrating the upper gasket, which corresponds to the lower assembly hole, head-support rods of the vehicle respectively pass through the upper assembly hole and the lower assembly hole and are fixed on the head-support fixer.

3. The installing module according to claim 1, wherein the material of the upper gasket and the lower gasket comprises polypropylene (PP), polyvinyl chloride (PVC), polyurethane (PU), unsaturated polyester, ABS resin, phenolic resin (PF), polyethylene (PE), or polyamide (PA).

4. The installing module according to claim 1, wherein the first locking plate further comprises a first locking portion and a first docking portion, the first concave is disposed on the first docking portion, the second locking plate further comprises a second locking portion and a second docking portion, and the second concave is disposed on the second docking portion.

5. The installing module according to claim 4, wherein the first locking portion protrudes from the first docking portion, the second locking portion protrudes from the second docking portion, the first locking portion and the second locking portion overlap each other, and the first docking portion and the second docking portion face each other.

6. The installing module according to claim 1, wherein the number of the first concaves is two, the first locking portion is disposed between the two first concaves, the number of the second concaves is two, and the second locking portion is disposed between the two second concaves.

7. The installing module according to claim 1, wherein the first locking plate comprises a first device locking hole, the second locking plate comprises a second device locking hole, and locking members respectively pass through the device bracket, the first device locking hole, and the second device locking hole to lock the device bracket to the seat bracket.

8. The installing module according to claim 1, wherein the first locking plate further comprises a first seat locking hole, the second locking plate comprises a second seat locking hole, and locking members respectively pass through the first seat locking hole and the second seat locking hole to lock the first locking plate and the second locking plate to each other.

9. The installing module according to claim 1, wherein the first locking plate further comprises a positioning hole, and the device bracket further comprises a positioning column, which passes through the positioning hole to position on the first locking plate.

10. The installing module according to claim 1, wherein the electronic device comprises a display.

* * * * *